United States Patent [19]
Verbeek

[11] 3,853,567
[45] Dec. 10, 1974

[54] PRODUCTION OF SHAPED ARTICLES OF HOMOGENEOUS MIXTURES OF SILICON CARBIDE AND NITRIDE

[75] Inventor: Wolfgang Verbeek, Krefeld, Germany

[73] Assignee: Bayer Aktiengesellschaft, Leverkusen, Germany

[22] Filed: Apr. 2, 1973

[21] Appl. No.: 347,585

[30] Foreign Application Priority Data
Apr. 19, 1972  Germany............................ 2218960

[52] U.S. Cl..................................... 106/44, 106/55
[51] Int. Cl. ...................... C04b 35/56, C04b 35/58
[58] Field of Search............................ 106/43, 44, 55

[56] References Cited
UNITED STATES PATENTS

| | | | |
|---|---|---|---|
| 2,618,565 | 11/1952 | Nicholson............................ | 106/55 |
| 3,222,438 | 12/1965 | Parr et al.............................. | 106/55 |
| 3,269,802 | 8/1966 | Wainer et al......................... | 106/44 |
| 3,468,992 | 9/1969 | Lubatti et al......................... | 106/44 |

*Primary Examiner*—J. Poer
*Attorney, Agent, or Firm*—Burgess, Dinklage & Sprung

[57] ABSTRACT

A shaped article such as a fiber comprising a homogeneous mixture of silicon carbide and nitride is produced by pyrolyzing at about 200° to 800°C a silazane to produce a fusible carbosilazane resin, forming the resin into fiber and heating the fiber in an inert atmosphere to about 800 to 2,000°C. The fiber or other shaped article prior to final pyrolysis may be rendered infusible. Various additives may be incorporated into the fusible carbosilazane prior to shaping.

9 Claims, No Drawings

PRODUCTION OF SHAPED ARTICLES OF HOMOGENEOUS MIXTURES OF SILICON CARBIDE AND NITRIDE

The present invention relates to a process for the manufacture of shaped articles of homogeneous mixtures of silicon carbide with silicon nitride, optionally mixed with silicon dioxide and/or carbon. By shaped articles, in the sense of the invention, there are understood fibers, filaments, flakes, powders, films, coatings, foams and the like manufactured from these mixtures, as well as the subsequent products obtained therefrom, such as mats, woven fabrics, bricks, pipes, crucibles, slabs, sleeves, grinding wheels and the like. Such shaped articles, because of their chemical composition, represent a material which is oxidation-resistant up to high temperatures. Their good physical properties, such as low density and excellent mechanical strength make them very suitable, in the form of fibers, filaments and flakes, for the reinforcement of plastics, glasses, ceramic materials and metals. Analogous coatings are suitable for the lining of parts of apparatus to be protected against corrosion at high temperatures, while foams of silicon carbide can be used very advantageously as a temperature-resistant and corrosion-resistant insulating material and filter material or catalyst support. Pipes, crucibles, bricks or the like of these mixtures are suitable for use as high temperature materials because of their good chemical resistance.

Silicon carbide continuous filaments can be manufactured in accordance with a known process by exposing a carbon filament, manufactured according to conventional processes, to a silicon tetrachloride gas atmosphere at 800°–1,200°C (U.S. Pat. No. 3,433,725). According to a further known process, silicon carbide continuous filaments are obtained by coating a thin tungsten filament with silicon carbide, which is formed on the tungsten surface, kept at 1,200° to 1,300°C, by pyrolysis of methyldichlorosilane (F. Galasso, et al., Appl. Phys. Lett. 9 (1966) 37). The disadvantage of these processes is that relatively thick silicon carbide fibers result which are difficult to handle, and their high manufacturing cost prevents a broad application.

Shaped articles such as, for example, pipes, crucibles or bricks can be manufactured according to known processes by sintering pulverulent silicon carbide, with addition of silicon powder, in appropriate molds, in most cases with the use of high pressures and temperatures, in the presence of nitrogen. In these cases, the silicon nitride formed acts as a sintering aid.

It is furthermore known to manufacture silicon carbide coatings on suitable shaped articles by pyrolysis of a mixture of slicon tetrachloride, toluene and hydrogen (K. Moers, Z. anorg. allg. Chem. 198 (1931) 243).

Foams of silicon carbide can be manufactured according to the process of U.S. Pat. No. 3,100,688, by reacting a mixture of finely divided silicon dust and carbon dust with dilute hydrofluoroic acid and heating the foam thereby formed, after drying, to a temperature of between 1,400° and 2,200°C under an inert gas.

The present invention relates to the production of shaped articles comprising homogeneous mixtures of silicon carbide and silicon nitride, optionally mixed with silicon dioxide and/or carbon, which is characterized in that silazane compounds are converted into a fusible carbosilazane resin by pyrolysis at temperatures between about 200° and 800°C, this resin, in the form of a melt or a solution, optionally with addition of auxiliaries, is converted into appropriate shaped articles and these are heated in an inert atmosphere to temperatures of between about 800° and 2,000°C. This leaves a shaped article which consists of a homogeneous mixture of silicon carbide with silicon nitride and possibly silicon dioxide and/or carbon. The shaped articles which are obtained in accordance with the present process are distinguished by the following composition:

| Si: | about 50 | to 70% by | weight |
| C : | do. 15 | do. 40% do. | do. |
| N : | do. 3 | do. 30% do. | do. |
| O : | do. 0 | do. 10% do. | do. |

While in the previously known processes for the manufacture of shaped articles it was necessary, in the case of fibers, to convert a substrate filament of carbon or tungsten into a filament consisting wholly or partially of silicon carbide by an expensive vapor deposition process, a filament which is very suitable for reinforcing purposes can be manufactured by the process according to the invention in a simple manner by spinning the carbosilazane resin and subsequent heat treatment. Difficulties also do not arise in the manufacture of other shaped articles such as films, coatings and foams, since the carbosilazane resin in the fused state can be accommodated extremely well in molds of the most diverse shape. It is furthermore advantageous not to manufacture articles such as grinding wheels, crucibles, pipes and bricks by means of conventional reaction sintering processes at very high temperatures but to press mixtures of auxiliaries, for example silicon carbide of varying particle size, with carbosilazane resin, into the desired shape at a low temperature and subsequently to calcine these mixtures.

The silazane compounds containing carbon which should be used for the manufacture of the carbosilazane resin are known in large numbers (compare, for example, E.A.V. Ebsworth, Volatile Silicon Compounds, Pergamon Press, Oxford, 1963; C. Eaborn, Organosilicon Compounds, Butterworths, London 1960; S. 339; U. Wannagat, Advances in Inorg. Chem. and Radiochem. VI, 225 (1964); B. J. Aylett, Silicon-Nitrogen Compounds).

These silazanes containing carbon are manufactured almost exclusively by reaction of a halogenosilane, such as, for example, tetrachlorosilane, trichlorosilane, methyltrichlorosilane, dimethyldichlorosilane, trimethylchlorosilane, phenyltrichlorosilane or diphenyldichlorosilane with a compound carrying one or more $NH_2$ or NH groups, for example primary or secondary amines, amides, hydrazines or hydrazides or, in the case of halogenosilanes containing carbon, also ammonia, with elimination of hydrogen halide. Thus, for example, methyltrichlorosilane can be reacted with methylamine in accordance with the following equation:

$$CH_3SiCl_3 + 6\ CH_3NH_2 \longrightarrow CH_3Si(NHCH_3)_3 + 3[CH_3NH_3]Cl.$$

In addition to the simple silane derivatives, disilazanes, cyclic silazanes and, in a small measure, also more highly condensed silazanes can be produced in the reaction of halogenosilanes with ammonia derivatives. Thus, for example, in the reaction between dimethyldichlorosilane and methylamine the compound $CH_3NH\ Si(CH_3)_2\ NCH_3\ Si(CH_3)_2$—$NHCH_3$ and the cyclic compound [(CH$_3$)$_2$ Si NCH$_3$]$_3$ are formed alongside (CH$_3$)$_2$Si(NHCH$_3$)$_2$. These compounds can be used equally well for the process according to the invention. It is possible to use halogenosilanes of the general formula R$_n$SiX$_{4-n}$, in which R = hydrogen, alkyl, alkenyl and/or aryl,
X = chlorine or bromine and
n = 0, 1, 2 or 3.

Preferably, each R independently is hydrogen or a C$_1$-C$_6$ radical, in particular a methyl, ethyl, propyl, vinyl or phenyl group.

The following are mentioned as examples of the halogenosilanes to be used: SiCl$_4$; SiHCl$_3$; SiH$_2$Cl$_2$; CH$_3$SiCl$_3$; (CH$_3$)$_3$SiCl; (CH$_3$)$_2$SiCl$_2$; (CH$_3$)$_2$SiHCl; (C$_2$H$_5$)$_2$SiCl$_2$; C$_2$H$_5$SiCl$_3$; CH$_2$ = CHSiCl$_3$; C$_6$H$_5$SiHCl$_2$ and others. Halogenosilanes which have a carbon-silicon atomic ratio of 1:1 to 4:1 are particularly preferred.

According to the invention, silazanes are used which are obtained by reaction of the halogenosilanes with, for example, the following primary or secondary amines, amides, hydrazines and/or hydrazides: aliphatic amines such as methylamine, dimethylamine, ethylamine, propylamine and butylamine, alicyclic amines such as cyclopropylamine, substituted hydrazines such as methylhydrazine, diamines such as ethylenediamine, tetramethylenediamine or hexamethylenediamine, aromatic amines and diamines such as aniline, methylaniline, diphenylamine, naphthylamine, toluidine, phenylenediamine, hydrazobenzene, benzidine, amides of monocarboxylic and polycarboxylic acids such as formamide and oxamide, carboxylic acid hydrazides such as acetylhydrazide, carbamides such as urea and thiourea, partially alkylated ureas, urethanes such as methylurethane and ethylurethane, biuret, semicarbazide, thiosemicarbazide, semicarbazone, guanidine, aminoguanidine, cyanamide, dicyandiamide, heterocyclic compounds such as pyrrole, pyrroline, pyrrolidine, pyrrolidone, indole, carbazole, pyrazole, imidazole, triazole, aminopyridine, piperazine, melamine and purine. Preferentially used organic bases are those which do not contain an oxygen atom in the molecule, especially pure nitrogen-hydrogen compounds such as ammonia or hydrazine and compounds which possess a carbon-nitrogen atomic ratio of 2:1 to 1:3, such as, for example, dimethylamine, ethylamine, methylamine, ethylenediamine, cyanamide, thiourea and guanidine.

The silazane compound obtained from halogenosilane and the compound bearing one or more NH$_2$ or NH groups is converted into a fusible carbosilazane resin by pyrolysis. For this purpose, the silazane compound is passed through a pipe of, for example, quartz or a ceramic mass, heated to about 200° – 800°C and filled with suitable packings such as Raschig rings or ceramic saddles. The resulting reaction mixture of pyrolysis gas, carbosilazane resin and possibly incompletely reacted silazane compounds is separated, and the last-mentioned fraction is again subjected to pyrolysis. From the pyrolysis gas, considerable amounts of the compound bearing one or more NH$_2$ or NH groups, required for the manufacture of the silazane compound, can be recovered. The carbosilazane resin can subsequently be subjected to a vacuum treatment at temperatures above the softening point in order to remove further volatile low molecular constituents. The resin is a yellow to red-brown, transparent, brittle, hydrolysis-insensitive product and is very readily soluble in the conventional solvents such as chlorinated hydrocarbons, aromatics and higher alkanes. The softening point of the resin depends on the pyrolysis temperature and on the nature of the silazane compound. It is generally between about 50°C and 400°C and appropriately above about 150°C.

The present process is hereafter described in more detail for the example of the manufacture of fibers. For this, a conventional known melt spinning process is appropriately used, since the carbosilazane resin has very good filament-drawing properties in the fused state in the range between its softening point and about 100°C above the latter. For example, the resin can be spun by means of a grid spinning process, wherein the resin granules are fused on a heated grid and subsequently forced through nozzles by means of a gear pump. The carbosilazane resin can furthermore be passed from a heated extruder to a spinning pump which forces the resin through nozzles of cross-section 50 to 500 μm into a spinning column, wherein the resulting continuous fibers solidify on winding up under tension. Furthermore, the resin can be spun by a nozzle blowing process or a centrifugal spinning process to give staple fibers. In this way glossy fibers, colored yellow-brown and having a crosssection of approximately 10 – 20 μm, can be spun.

Since, as has already been mentioned, the carbosilazane resin is soluble in a large number of organic solvents such as, for example, methylene chloride and chloroform, it can also be processed in the form of a solution to give suitable shaped articles. Thus it is possible to manufacture fibers, for example by means of a conventional dry spinning process or wet spinning process. The spinning properties of the solution can be improved substantially further if linear polymeric high molecular auxiliaries with degrees of polymerization of above about 10,000 added to the solutions at a concentration of about 0.01 to 2 percent by weight. As linear polymeric substances it is possible to use vinyl polymers, vinyl copolymers, diolefin polymers, polyethers, polythioethers, polyesters, polyamides and polypeptides. Polyethylene oxide, polyisobutylene, polymethyl methacrylate, polyisoprene and polystyrene have proved particularly suitable.

If appropriate, the fibers must, before the actual pyrolysis, be subjected to a pre-treatment which can consist of a heat treatment and/or an oxidation and/or a sulfidation and/or a hydrolysis and which serves the purpose of rendering the carbosilazane resin infusible. For example, the carbosilazane resin can be further crosslinked at temperatures between room temperature and the temperature of the softening point, under an inert gas, and can thereby be rendered infusible. It is furthermore possible also to treat the resin by means of moist air or moist inert gas at temperatures between room temperature and the temperature of the softening point, with the infusibility being brought about through the formation of silicon-oxygen bonds. However, the carbosilazane resin can also very simply be rendered infusible by oxidation. For this it is possible to use oxidizing or dehydrogenating or dehydrating agents such as, for example, air, oxygen, ozone, halogens, sulfur vapor, nitrogen oxides, hydrogen peroxide and organic peroxides, potassium permanganate and sulfur compounds such as hydrogen sulfide or sulfur dioxide. A treatment with Lewis acids such as aluminum trichloride, boron trihalide or sulfur trioxide can also be carried out in order to ensure infusibility. For example, the carbosilazane resin fibers are introduced, in a suspended state, into a tubular furnace and are therein exposed, for a time of 0.5 – 24 hours, to the desired reaction to bring about infusibility.

During the pyrolysis which follows rendering the material infusible, all constituents which are still volatile are eliminated. For this purpose the fibers are heated, if appropriate under tension, in an inert gas such as nitrogen, ammonia, argon or hydrogen to a temperature of about 800° to 2,000°C. In detail, the temperature treatment depends on the carbosilazane resin used. The rate of heating is about 1°C/minute – 20°/minute. Up to a sintering temperature of about 1,600°C, the fibers consist of homogeneous mixtures of silicon carbide which is amorphous to X-rays with silicon nitride and possibly silicon dioxide and/or carbon. During the heat treatment, a part of the nitrogen is split off. The nitrogen content, or the silicon nitride content, of the heat-treated end products therefore does not correspond to the nitrogen content of the starting products. Depending on the temperatures used, and depending on the choice of the starting products, it is thus possible to manufacture products with a greater or lesser content of silicon nitride. At a higher temperature, $\beta$—SiC and $\beta$—$Si_3N_4$ are formed. The fibers subjected to the heat treatment are completely oxidation-resistant up to a temperature of about 1,200°C and are mechanically extremely strong structures. To assess the mechanical properties of the fibers, measurements of the tensile strength and of the modulus of elasticity were carried out. For this a commercially available tensile-testing machine (Messrs. Zwick) was employed. At a sintering temperature of about 1,200°C, the fibers already display very good mechanical properties. The tensile strength is between about 1.3 and 2.5 $GN/m^2$ and the modulus of elasticity is about 160 – 250 $GN/m^2$ (clamped length: 2.5 cm).

The modulus of elasticity can be increased further if the fibers are briefly brought to higher temperatures, up to about 2,000°C, under argon. Because of their good mechanical properties and the oxidation resistance even at high temperatures, the fibers are very suitable for use for the reinforcing of plastics, but especially of glasses, ceramics and metals. Furthermore, the fibers are outstandingly suitable for high temperature insulation and for use as a filter material for hot, corrosive gases and melts.

To manufacture coatings of homogeneous mixtures of silicon carbide with silicon nitride and, possibly, silicon dioxide and/or carbon, the surface to be protected by a coating can be impregnated, or brushed, with a carbosilazane resin solution or melt. After the heat treatment, firmly adhering, gas-tight protective layers of the desired thickness result, which are insensitive to corrosion at high temperatures.

Films and flakes of high strength, pore-free and, in this form, flexible homogeneous mixture of silicon carbide with silicon nitride and possibly silicon dioxide and/or carbon can be manufactured by rolling of the carbosilazane resin at a suitable temperature or by allowing a melt to flow out onto a smooth substrate containing a release agent and, optionally after being rendered infusible by carrying out a heat treatment under an inert gas. Foams are obtained if the carbosilazane resin, optionally with addition of a conventional blowing agent such has, for example, diphenylsulfone-3,3'-disulfohydrazide, ammonium carbonate or N,N'-dinitrosopentamethylenetetramine, is foamed by heating in an appropriate mold and is subsequently, optionally after being rendered infusible, heated to about 800°–2,000°C under an inert gas. Foams thus obtained have an extremely low density and are very suitable for use as insulating media and filtration media at very high temperatures.

Solutions of carbosilazane resin are also outstandingly suitable for the manufacture of films and coatings. In the manufacture of foams, the solvent can also advantageously be employed as a blowing agent.

The carbosilazane resins can also be processed, mixed with silicon carbide and/or silicon nitride, to give articles of any desired shapes such as slabs, pipes, bricks, crucibles, rods and the like. The silicon carbide and/or silicon nitride can have been obtained in any desired manner. The shaped articles (fibers, powders, granules and the like) of a mixture of slicon nitride and silicon carbide, manufactured in accordance with the present process, are also particularly suitable. The carbosilazane resins are employed in the form of a melt or of a solution. It is also possible to process, under pressure, solid, ground carbosilazane resins mixed with the silicon carbide and/or silicon nitride. For further modification, it is possible to manufacture shaped articles of carbosilazane resins and other heat-resistant and/or corrosion-resistant substances, such as, for example, inorganic oxides, mixed oxides, carbides, borides, nitrides, metals, silicates, graphite and carbon and the like. Linings having a catalytic surface can also be obtained in this manner.

The quantity ratios of silicon carbide and/or silicon nitride on the one hand and carbosilazane resin on the other can be varied within wide limits. It is possible to add silicon carbide and/or silicon nitride in proportions of, for example, about 5 to 95 %, by weight relative to the total carbosilazane resin-containing mixture. Preferably, the proportion is between about 40 and 90 %. Optionally, silicon dioxide and/or carbon or other fillers can also be added to the mixture, as already mentioned.

The green shaped articles are heated under an inert gas to temperatures of between about 800° and 1,400°C. Higher temperatures, for example up to about 2,000°C, are possible but in no way necessary for obtaining mechanically stable shaped articles such as, for example, grinding wheels, pipes, crucibles, bricks and the like. If the proportion of the carbosilazane resin in the mixture was high it may be necessary to render the shaped articles infusible, before the heat treatment, in the manner already described.

The carbosilazane resin is furthermore outstandingly suitable for sealing porous articles of refractory materials such as, for example, troughs, crucibles, pipes or the like. For this purpose, the article is impregnated, appropriately in vacuo, with the resin — either as a melt or as a solution — and is subsequently calcined at about 800°–1,400°C under an inert gas. If necessary, the process can be repeated several times until complete sealing is achieved. The process according to the invention is explained in more detail below in the following examples.

EXAMPLE 1

300 g of methyltrichlorosilane, dissolved in 3 l of petroleum ether, are reacted with 374 g of methylamine at 40°C. In addition of [CH$_3$NH$_3$]Cl, the compound CH$_3$Si(NHCH$_3$)$_3$ is formed, which is purified by distillation. 50 g of the liquid which boils at approximately 150°C are passed, over the course of 3 hours, through a glass tube filled with Raschig rings and heated to 520°C. The reaction mixture hereupon formed by pyrolysis is passed into a flask kept at 450°C where separation into the desired carbosilazane resin and into products which can still be distilled and can be recycled to the pyrolysis takes place. At the same time approximately 1.5 moles of methylamine are formed per mole of CH$_3$Si(NHCH$_3$)$_3$ and are recovered. The carbosilazane resin formed (29 g) is freed of small amounts of low-boiling components by applying a vacuum at 300°C. It is a yellow, brittle, transparent, hydrolysis-insensitive product which is soluble in conventional solvents and has a softening point of 160°C. The carbon:silicon weight ratio determined by analysis is 1:0.88. The resin is spun at a temperature of 220°C and a pressure of 0.1 atmosphere gauge from 400 μm nozzles at a take-up speed of 250 m/minute to give filaments having a diameter of 12 – 14 μm. The filaments are rendered infusible by treating them with moist air for 20 hours at 110°C. They are heated over the course of 7 hours to 1,200°C in a N$_2$ atmosphere under slight tension, and are then heated to 1,500°C over the course of 5 minutes. The loss in weight is 45%. A black, glistening filament which is completely insensitive to oxidation at 1,200°C, is amorphous to X-rays and has a tensile strength of 1.3 GN/m$^2$ (Giga Newton per square meter) and a modulus of elasticity of 185 GN/m$^2$ is obtained. The filament is heated to 1,800°C under argon. According to X-ray analysis, it consists of β-SiC, a little α-SiC and β-Si$_3$N$_4$.

EXAMPLE 2

300 g of dimethyldichlorosilane are dissolved in 3 l of petroleum ether and reacted with 433 g of methylamine at 40°C. Hereupon the compound (CH$_3$)$_2$Si(NHCH$_3$)$_2$, boiling at approximately 110°C, is formed in addition to methylamine hydrochloride and is purified by distillation. 270 g thereof are passed over the course of 8 hours through a quartz tube, filled with Raschig rings, at 650°C. The reaction mixture is passed into a flask kept at 400°C and the cyclic compound [(CH$_3$)$_2$SiNCH$_3$]$_3$ which is formed, with elimination of 3 moles of methylamine, in the first reaction step and distils off is again passed through the pyrolysis zone. After the distillation sump material has been freed of low molecular constituents in vacuo at 300°C, 145 g of a light brown, brittle, hydrolysis-insensitive carbosilazaned resin having a carbon:silicon weight ratio of 1: 1.18 and a softening point of 190°C are obtained. The resin is spun at a temperature of 315°C and a pressure of 0.5 atmosphere gauge from 400 μm nozzles, at a take-up speed of 250 m/minute, to give filaments having a diameter of 18 – 5 μm. The filaments are treated for 16 hours with air at 170°C and are thereby rendered infusible. When heated for 6 hours to 1,200°C under slight tension and in a N$_2$ atmosphere, 46% loss in weight occurs and a black, glossy, oxidation-insensitive filament which is amorphous to X-rays and has a tensile strength of 1.4 GN/m$^2$ and a modulus of elasticity of 200 GN/m$^2$ results.

EXAMPLE 3

14 g of carbosilazane resin from Example 1 are dissolved in 46 g of methylene chloride. 20 g of a solution which contains 2% of polyethylene oxide (moelcular weight 4,000,000) dissolved in methylene chloride are added thereto, while stirring. The mixture is stirred for 2 hours and the resulting spinning solution is filtered and degassed. The spinning solution is spun under a spinning pressure of 0.3 – 0.4 atmosphere gauge at a spinning column temperature of 20°C through a nozzle of 400 μm diameter, to give filaments having a cross-section of 10 – 14 μm at a take-up speed of 250 m/minute. The filaments are heat-treated for 5 hours in air at 100°C and heated to 1,200°C under nitrogen over the course of 5 hours. A black, glossy filament having a tensile strength of 0.4 – 0.8 GN/m$^2$ and a modulus of elasticity of 120 – 160 GN/m$^2$ results. (Clamping length: 2.5 cm).

EXAMPLE 4

2 g of carbosilazane resin fiber from Example 1 are heated to 175°C over the course of 3 hours in the presence of hydrogen sulfide and subsequently to 1,200°C over the course of 5 hours under nitrogen. The tensile strength is 2.4 – 2.8 GN/m$^2$ and the modulus of elasticity is 140 – 160 GN/m$^2$. (Clamping length: 1 mm).

EXAMPLE 5

To manufacture a film, the carbosilazane resin from Example 1 is rolled out at 175°C, by means of a Teflon-polytetrafluorethylene-coated pair of rollers, to give a filme 25 μm thick and the resulting film is treated for 18 hours in moist air at 115°C and is thereby rendered infusible. For pyrolysis, the film is out into 5 cm wide strips and heated under light tension to 1,200°C over the course of 7 hours in a N$_2$ atmosphere. A flexible, oxidation-insensitive, black film is obtained which consists essentially of silicon carbide amorphous to X-rays and is 20 μm thick.

EXAMPLE 6

A foam was manufactured by heating the carbosilazane resin from Example 1 in a porcelain boat to 1,200°C over the course of 2 hours under N$_2$. In the course thereof, the pyrolysis gases cause the fused resin to foam to 15 times its original volume. The resulting foam is oxidation-insensitive and is an insulating material which can be used at up to 1,500°C. Its density is 0.05 g/cm$^3$.

It will be appreciated that the instant specification and examples are set forth by way of illustration and not limitation, and that various modifications and changes may be made without departing from the spirit and scope of the present invention.

What is claimed is:

1. A process for producing shaped forms comprising homogeneous mixtures of silicon carbide and silicon nitride, which comprises pyrolyzing at a temperature of about 200° to 800°C a silazane to produce a fusible carbosilazane resin, shaping said carbosilazane resin into predetermined form, and heating said shaped form of carbosilazane resin to about 800° to 2,000°C in an inert atmosphere, thereby to convert the carbosilazane to silicon carbide and silicon nitride.

2. The process according to claim 1, wherein the silazane is produced by reaction of a chlorosilane with an amine, amide, hydrazine or hydrazide.

3. The process according to claim 2, wherein the chlorosilane is at least one member selected from the group consisting of silicon tetrachloride, silicochloroform, methyltrichlorosilane, dimethyldichlorosilane, methyldichlorosilane, dimethylchlorosilane, trimethylchlorosilane, vinyl trichlorosilane, ethyltrichlorosilane, diethyldichlorosilane and phenyldichlorosilane, and the amine, amide, hydrazine or hydrazide is at least one member selected from the group consisting of ammonia, hydrazine, methylamine, dimethylamine, ethylamine, ethylenediamine, cyanamide, thiourea, and guanidine.

4. The process according to claim 1, wherein the shaped carbosilazane resin prior to heating to 880° to 2,000°C is rendered infusible by at least one of heat treatment, oxidation, sulfidation, hydration and hydrolysis.

5. The process according to claim 1, wherein the shaping of the carbosilazane resin is effected by dry or melt spinning a solution or melt of the carbosilazane to produce carbosilazane fibers.

6. The process according to claim 5, wherein the solution or melt of carbosilazane to be spun into fibers has incorporated therein about 0.01 to 2 percent by weight of a linear organic polymer having a degree of polymerization above about 10,000.

7. The process according to claim 6, wherein the linear organic polymer is at least one member selected from the group consisting of polyethylene oxide, polystyrene, polyisobutylene, polymethyl methacrylate and polyisoprene.

8. The process according to claim 1, wherein to the fusible carbosilazane prior to shaping there is added at least one heat resistant material selected from the group consisting of carbides, nitrides, borides, oxides, metals and carbon in an amount ranging from about 5 to 95 percent by weight of the carbosilazane-containing mass.

9. A fiber produced by the process of claim 1 comprising a homogeneous mixture of silicon carbide and silicon nitride having the approximate composition by weight percent:

| | |
|---|---|
| Si: | 50–70 |
| C : | 15–40 |
| N : | 3–30 |
| O : | 0–10 | and having a tensile strength of at least about 1.3 $GN/m^2$ and a modulus of elasticity of at least about 160 $GN/m^2$.

* * * * *